(12) United States Patent
Millard et al.

(10) Patent No.: US 12,529,400 B2
(45) Date of Patent: Jan. 20, 2026

(54) SELECTIVE FLUID DELIVERY UNIT FOR A POWER TRANSMISSION

(71) Applicants: Dmitri Millard, Germantown, OH (US); Graydon Thomas Udelhoven, Billings, MT (US)

(72) Inventors: Dmitri Millard, Germantown, OH (US); Graydon Thomas Udelhoven, Billings, MT (US)

( * ) Notice: Subject to any disclaimer, the term of this patent is extended or adjusted under 35 U.S.C. 154(b) by 4 days.

(21) Appl. No.: 18/789,949

(22) Filed: Jul. 31, 2024

(65) Prior Publication Data
US 2025/0354588 A1 Nov. 20, 2025

Related U.S. Application Data

(63) Continuation-in-part of application No. 18/663,809, filed on May 14, 2024, now Pat. No. 12,228,207.

(51) Int. Cl.
*F16D 48/02* (2006.01)

(52) U.S. Cl.
CPC ......... *F16D 48/0206* (2013.01); *F16D 25/14* (2013.01); *F16D 2048/0221* (2013.01)

(58) Field of Classification Search
CPC ................. F16D 48/0206; F16D 25/14; F16D 2048/0221
See application file for complete search history.

(56) References Cited

U.S. PATENT DOCUMENTS

| | | | |
|---|---|---|---|
| 7,402,124 B2 * | 7/2008 | Stevenson | F16D 48/0206 477/158 |
| 7,556,120 B2 * | 7/2009 | Sah | F16H 61/0031 180/305 |
| 8,733,528 B1 | 5/2014 | Goerend | |
| 11,994,174 B1 * | 5/2024 | Wiegandt | F16D 48/02 |
| 2007/0284176 A1 * | 12/2007 | Sah | B60K 6/40 180/305 |
| 2017/0241520 A1 * | 8/2017 | Reinhart | F16H 9/26 |
| 2020/0166087 A1 * | 5/2020 | Ono | F16H 61/0021 |
| 2020/0292067 A1 * | 9/2020 | Van Raemsbonck | F16H 61/0025 |
| 2022/0163074 A1 * | 5/2022 | Cattoor | F16H 61/061 |
| 2023/0070513 A1 * | 3/2023 | Di Lisa | F16D 48/062 |

* cited by examiner

*Primary Examiner* — Farhana Pervin
(74) *Attorney, Agent, or Firm* — R. William Graham

(57) ABSTRACT

A unit for selective fluid delivery to a predetermined clutch package in a power take off component of a transmission having by a transmission control module includes a controller preferably operably connected to the transmission control module for receiving data signals indicative of a clutch package engagement state and an actuable valve operably connected to the programmable logic controller and disposed in a transmission fluid line, the controller selectively controls the actuatable valve to permit variable fluid flow pressure to the predetermined clutch package as a function of the data signals.

6 Claims, 14 Drawing Sheets

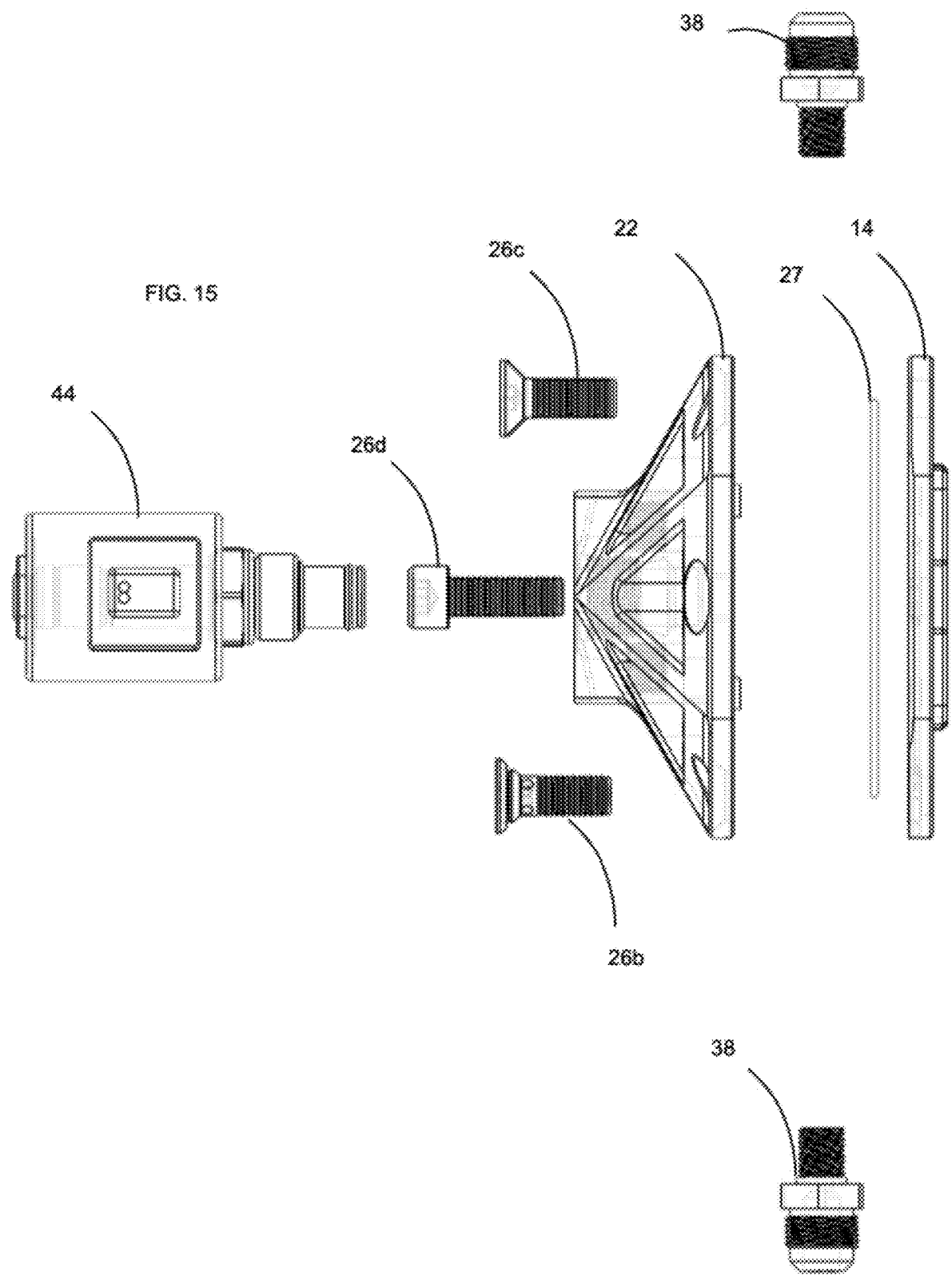

SELECTIVE FLUID DELIVERY UNIT FOR A POWER TRANSMISSION

This is a continuation-in-part of U.S. application Ser. No. 18/663,809 filed May 14, 2024.

FIELD OF THE INVENTION

The present disclosure relates to an automatic transmission, and in particular to a selective fluid delivery to a clutch package in a power transmission. This unit is well suited for used when manipulating a normal gear progression of a transmission by selectively controlling a clutch package to perform as a brake to offset one or more clutch package attempting to drive a vehicle in a forward position.

BACKGROUND OF INVENTION

A conventional internal combustion engine is coupled to a transmission which in the case of a truck, can include an Allison® 1000 or other model, for example. A typical Allison® automatic is fully electronically controlled which employs an electronic controls package which oversees the operation of the transmission, controlling transmission upshifts and downshifts, and providing important information on the operation of the drive system. Readouts enable monitoring transmission oil levels and reading diagnostic codes.

With original equipment manufacturers (OEMs), street versions of the Allison (and other type) transmissions are specified to naturally move from first gear upward to a max drive and then backed down in a reversed stepwise manner. The progression is performed through an automated controller. These transmissions are also equipped with a tow mode and the ability to start the vehicle in a higher gear by engaging a second gear or third gear clutch pack.

Recently, there has been a desire to enhance these transmissions to enable them to convert from their traditional street legal versions to a racing application. In this regard, racers or people desiring more initial speed of the vehicle look for enhancements to improve desired performance. As in the case of a truck having an Allison 1000 transmission, a transmission control module (TCM) Tuning is provided with a modification of the programming calibration of a vehicle's TCM, which handles the strategy, timing, and schedule for switching between gears. Tuning, in this use, is an aftermarket adjustment to the calibrations that are programmed by the factory. Coming from the factory, a truck's transmission calibration leaves a lot to be desired. In modern trucks, the shifting is decided by the computer, from determining line pressure through the gears to deciding when the torque converter locks up.

The factory calibration isn't configured for optimal performance or driving experience, leaving potential significant room for enhancements. Recently, one of the inventors developed a device to manipulate transmission performance and to hold the vehicle in place while in drive (2nd or higher gear) by applying a selected clutch. While this prior invention provided a mechanism to manipulate the clutch packages, there is a need to further improve upon the transmission and power take off (PTO) for more safely and securely transferring power from the engine. The instant invention provides a solution to meet a desired need of enhancing manipulation to existing transmissions.

SUMMARY OF THE INVENTION

An object of the invention is to provide a selective controlled fluid delivery system for delivering cooling fluid to a clutch package of a transmission.

It is also an object is to provide a unit for selective fluid delivery to a predetermined clutch package to assist in cooling a clutch package which is employed in a transmission.

Another object is to provide a transmission with enhanced selective fluid delivery to a predetermined clutch package, particularly for a trans-brake mechanism to provide for selective clutch package manipulation.

Still another object to enhance the process for manipulating transmission performance to hold the vehicle in place while in drive (2nd or higher gear) by applying a selected clutch.

Accordingly, the invention is directed to a unit for selective fluid delivery to a predetermined clutch package in a power take off component of a transmission operably connected to a transmission control module (TCM). Gears of the transmission are determined by the TCM based off the gear selector and sensor inputs.

The unit includes a programmable logic controller (PLC) operably connected to the TCM for receiving data signals indicative of a clutch package engagement state. The PLC is operably connected to an actuatable valve disposed in a transmission fluid line to selectively control the actuatable valve and permit selected fluid flow to the predetermined clutch package as a function of the data signals received. By so providing, the PLC can adjust from an off state to a low pressure or high pressure fluid flow state to enhance cooling of the clutch package as needed. By way of example, the PLC adjusts fluid pressure when sensing the engaging of the C3 (aka 3-5-R) clutch package engagement and can be in low pressure fluid flow state. Thus, the unit for modifying an automatic transmission to provide enhanced performance in the transmission or power take off is provided The TCM is equipped to run the transmission in a normal drive gear mode with shifting beginning from low gear and progressing to the higher gears. In this case, the unit's valve is equipped as a common valve port to provide which permits fluid to enter therethrough, but not into the PTO area adjacent the C3. The TCM also has the ability to be tuned or modified for race applications and a higher gear start is possible through Tow/Haul mode. This allows for the ability to apply a select clutch package to lock up the transmission/ hold the vehicle in place while in drive when activated. While activated rpm can be increased or decreased based off desired acceleration rate. When deactivated, a low gear and a plurality of high gears and a transmission control module is equipped to run the transmission in a normal start gear mode with shifting beginning from low gear and progressing to the higher gears and a higher start gear mode beginning at one of the higher gears. The unit can actuate the valve to open flow in a low or high pressure flow state to the C3 package.

The trans-brake system includes a clutch brake mechanism which when actuated on during initiation of the higher start gear mode, applies increased pressure on a predetermined clutch package creating a temporary clutch brake to keep in check clutch packages engaged for the higher start gear mode, and upon actuating off releases the predetermined clutch package thereby enabling enhanced take off speed with the high gear clutch packages being fully engaged.

This modification typically leads to increased heat and quicker than perhaps desired release of the C3 clutch pack. Accordingly, being able to selectively cool the package in accordance with received input of the engaged clutch packages is highly desirable.

For example, the unit can employ a solenoid valve having a common port to control factory C3 (3-5-R) transmission fluid to or from C3 (3-5-R) package. The unit can selectively control the amount of fluid flow when fluid is the trans-brake mechanism is operating, for example, used to control fluid flow to/from the factory C5 supply to the C5 piston when energized or not energized. This allows for the transmission to shift or drive between a racing start mode and the normally designed start from the factory.

In one embodiment, there can be multiple like formed units formed, one one the driver side as well as the passenger side of the transmission PTO cover area. A first unit can include a solenoid to receive transmission fluid through a first feed line from a transmission fluid supply reservoir, and deliver transmission fluid through a second feed line to a second unit having also having a solenoid with common port, and in the case of a pass through to the second unit, the fluid remains in a ready state until the units are activated to either a low or high pressure flow state to cool a predetermined clutch package, e.g., C3, to provide a cooling effect. The PLC is connected to each solenoid valve to selectively control the amount of fluid flow.

As described in the prior application, a dash mounted controller can be actuated manually through a switch mounted inside the vehicle, such as a momentary switch on a steering wheel. Additionally, a bump switch can also be added to pause the action of the controller and temporarily permit the disengagement of the predetermined clutch package. By tapping on the bump switch, it can bump the vehicle forward. The PLC can receive the output signals from the TCM and be in an active input mode relative to the TCM output signals.

As was mentioned, it is important to note that controller should only be active when stopped and the TCM is in the higher start gear mode and at the initiation of this mode. In other words, severe damage could occur if the system where activated while the vehicle was moving. Accordingly, a sensor can be provided, such as a speed sensor, wherein the controller is prevented from actuating on preventing the fluid flow communication between the one or more solenoid to the main line transmission fluid feed.

Accordingly, the following drawings and description will describe the invention in a more detailed manner.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 15 is an exploded side view of the embodiment in FIG. 13.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 3:
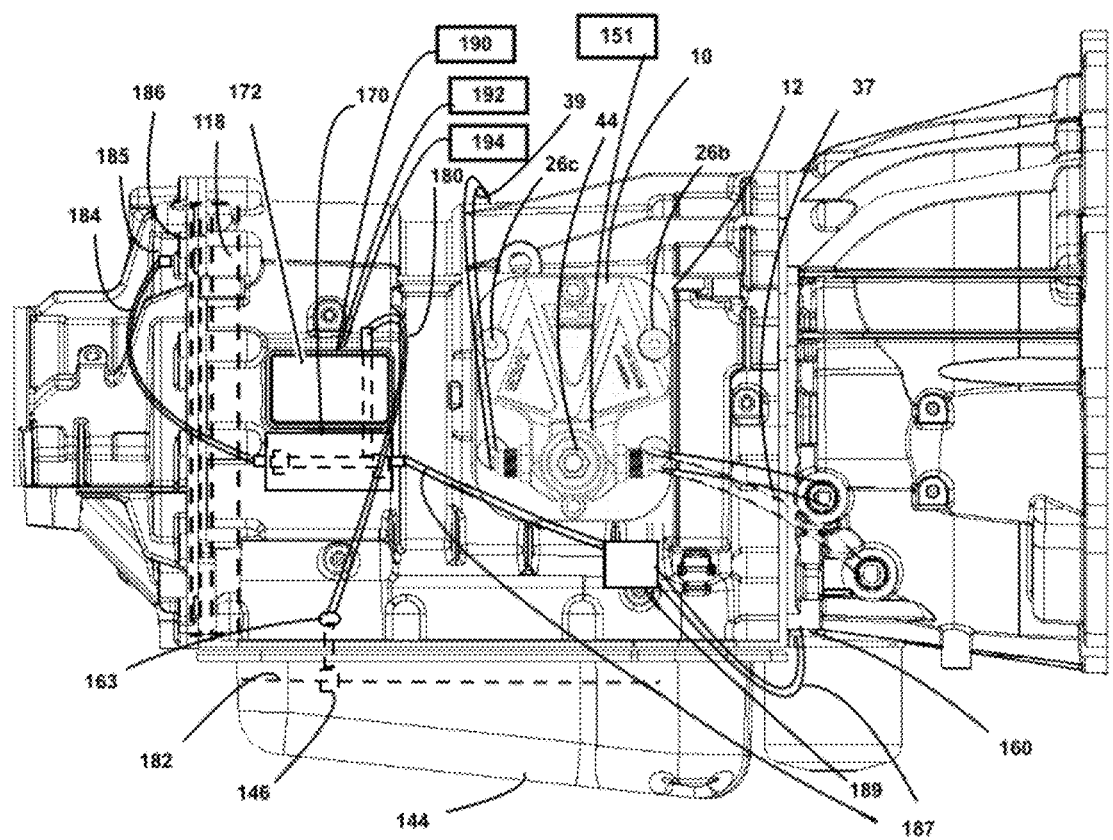
FIG. 3 is a flow chart illustrating the operation of the system of the instant invention.
Figure 4:
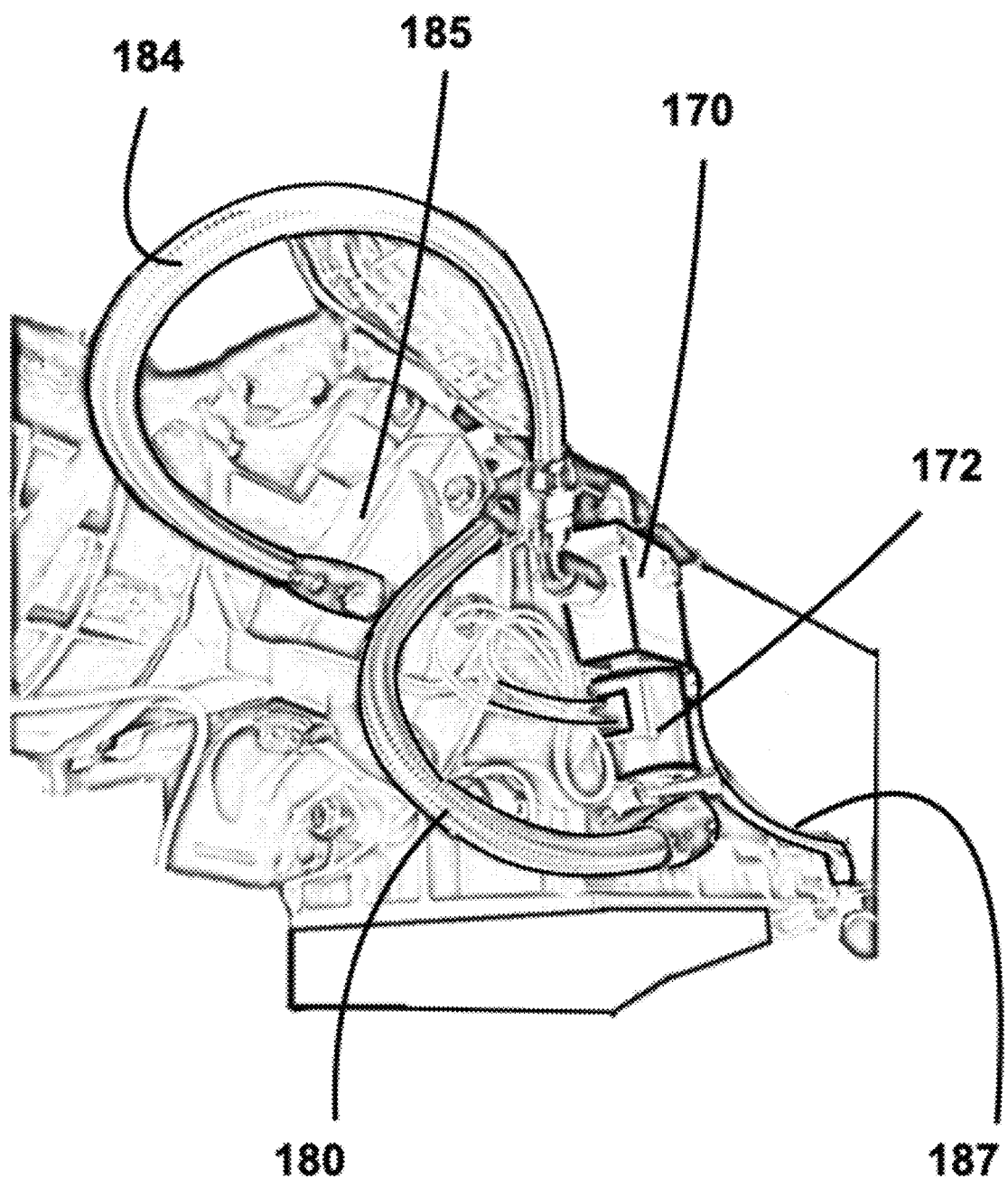
FIG. 4 depicts a perspective view of the system of the invention mounted on a transmission.
Figure 13:
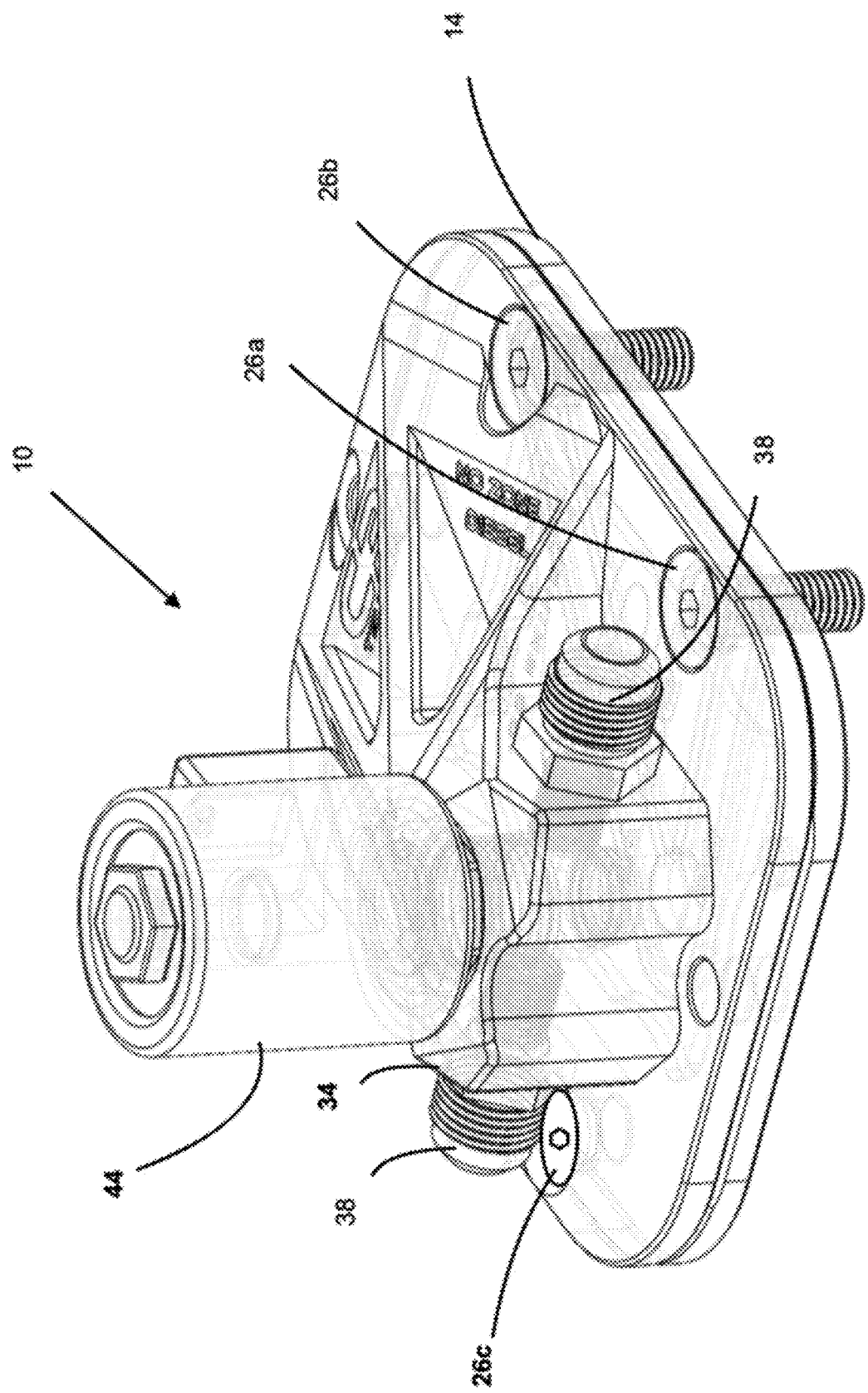
FIG. 13 depicts a perspective view of an embodiment for improvement in modulated transmissions.
Figure 14:
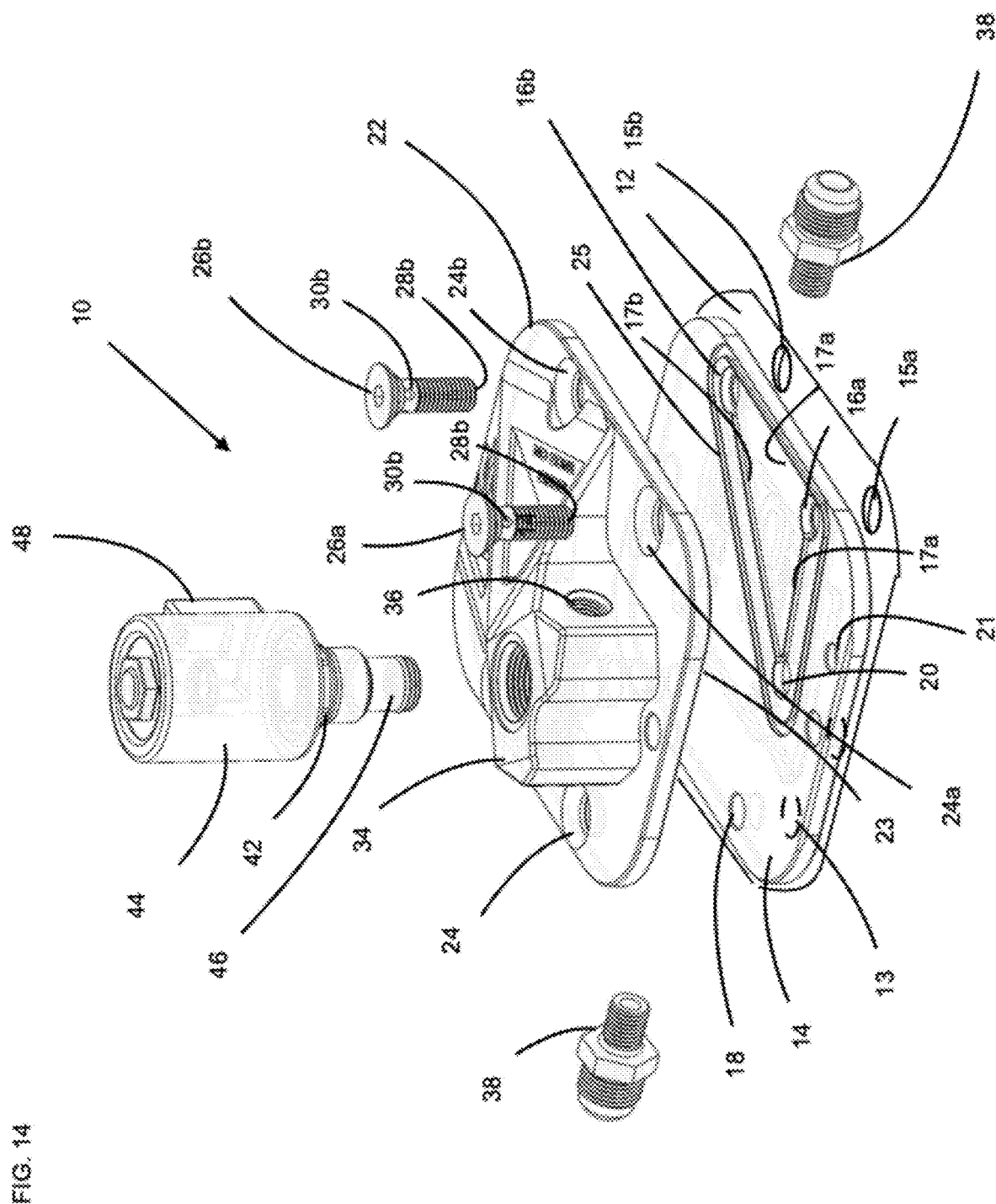
FIG. 14 depicts an exploded perspective view of the embodiment in FIG. 13.

Referring now to improvement for a modified transmission having a transbrake mechanism as described hereinafter, as seen in FIGS. 3, 13-14, one or more unit for selective fluid delivery is designated by the numeral 10. Ideally, a unit 10 is disposed on each of the passenger and driver side of a transmission 104 by attaching to the PTO cover area 12 of a transmission housing 105. The unit 10 can be part of or replace the power take off cover, and is contemplated as integral or separate components. Additionally, it is contemplated that the unit can employ a control unit which can be automatically or manually actuated on, which initiates fluid flow to a predetermined clutch package and an exemplary embodiment is provided herein. Here, the unit 10 is seen by way of example as including separate components in FIG. 13 and FIG. 14.

The unit 10 includes a base plate 14 which can be sealably connected to the power take off area 12 of a transmission 104. In the case of mounting to conventional power take off cover area 12, there are provided a number of threaded mounting apertures 13 and a plurality of threaded bores 15*a* and 15*b* through which transmission fluid can pass to a clutch pack, e.g. C3 as will be described hereinafter.

The base plate 14 includes a plurality of open surfaces 16*a* and 16*b* which are a spaced apart on the base plate 14 to be co-aligned with threaded bores 15*a* and 15*b*. Additionally, the base plate 14 has a plurality of mounting through holes 18 which co-align with threaded mounting apertures 13. Each of the open surfaces 16*a* and 16*b* and a recessed surface 20 are surrounded by basin walls 17*a*, 17*b*, and 17C, all of which form a basin 31. The basin to receive transmission fluid and enable flow to the bores 15*a* and 15*b* as will become apparent hereinafter. A peripheral channel 25 receives a seal 27.

The unit 10 includes a complementary formed upper plate 22 having tapered open surfaces 24*a* and 24*b* which co-align with open surfaces 16*a* and 16*b* to receive a respective threaded mounting member 26*a* and 26*b*. Additional tapered open surfaces 24 can be provided and complementary oriented to co-align with mounting through holes 18 and to receive threaded mounting members 26*c* (e.g., recessed head type) and 26*d* (e.g., round head protruding type). To assist in mating with the base plate 14 and the upper plate 22, there is provided a recess 21 in base plate 14 and a protrusion 23 from upper plate 22 which mate to one another.

A unique feature of the threaded mounting member 26a and 26b is the inclusion of an axially extending bore 28a and 28b which intersects a radially extending bore 30a and 30b, respectively. The radially extending bore 30a and 30b are axially spaced from a respective tapered head 32a and 32b such that when the heads 32a and 32b are fully seated in tapered open surfaces 24a and 24b, the radially extending bore 30a and 30b lie in communication with basin 31, respectively.

The upper plate 22 includes a protruding portion 34 which has opening surfaces 36 part of which are threaded to receive threaded transmission fluid line connectors 38. Intersecting the axial opening surfaces 36 is an open surface 40, part of which is threaded, and extends through the upper plate 22 and is oriented that when connected to the base plate 14, communicates with basin 31. The open surface 40 receives a threaded neck 42 of a solenoid valve 44.

The solenoid valve 44 includes an actuatable part (shuttle valve) 46 which opens and closes communication between the open surfaces 36, the basin 20 which leads to the C3 package in the PTO area 12. The solenoid valve 44 is connected to a programmable logic controller (PLC) 48 operably connected to transmission control module (TCM) 151 for receiving data signals indicative of a clutch package engagement state. The PLC 48 is operably connected to the solenoid valve 44 which as described is disposed to receive transmission fluid and the PLC 48 selectively controls the solenoid valve 44 to foreclose or permit predetermined amount of fluid flow to a predetermined clutch package, i.e., C3, as a function of the data signals. Although not as preferred, it is also contemplated in the invention that an independent controller mechanism or switch in lieu of the TCM 151 can be employed which can initiate the actuation of the solenoid valve 44 off and on, as selected and the invention is in intended to cover these embodiments as well.

As seen in FIG. 3, there are shown two ports 36 one of the units 10 can simply have one port 36 serve as an input from one line 37 which receives transmission fluid from an access port (see solid line and dashed lines for 37) and the other as an output to feed fluid through line 39 to another unit 10 on the other side of the transmission 104 noting that the solenoid 44 includes a common port and in this case, one of the ports 36 of the receiving unit 10 can be plugged off. Another option is where two ports 36 which can serve as dual inputs in the case where a transmission fluid line is T split to feed both sides to the solenoid 44 through multiple lines 37 to connectors 38

In a case where there is no enhanced transmission clutch package engagement, the unit 10 will not permit fluid flow to the basin 31. In the case of sensing certain clutch package engagement, the logic operation PLC 48 will actuate the valve 46. Here, the TCM 151 will provide 5 inputs, call these A, B, C, M and P, which are converted data to be referenced by PLC 48 as B1, B2, B3, B4 and B5, respectively. There are two outputs data bits provided based on a particular clutch pack engaged, those are D1 for high pressure, e.g. 80 psi, and D2 for low pressure, e.g., 20 psi.

The following are exemplary data and transmission states:

| Transmission state | Input B1 | Input B2 | Input B3 | Input B4 | Input B5 | Output either D1/D2 | Clutch pack engaged |
|---|---|---|---|---|---|---|---|
| Park | x | x | x | | | D1 | LR |
| Reverse | | x | x | | | D2 | LR & 3-5 |
| 1st | | x | | | | D1 | LR & 1-2-3-4 |
| 2nd | | | | x | x | D1 | 1-2-3-4 & 2-6 |
| 3rd | x | | | | | | 1-2-3-4 & 3-5-R |
| 4th | x | | x | x | x | | 1-2-3-4 & 4-5-6 |
| 5th | | | x | | | | 4-5-6 & 3-5-R |
| 6th | | | x | x | | | 4-5-6 & 2-6 |
| Neutral | x | x | x | | | x | LR |

By so providing, the PLC 38 can adjust for low pressure or high pressure fluid flow to enhance cooling of the desired clutch package. The fluid pressure is adjusted, applying low pressure, when sensing the engaging of the C3 (aka 3-5-R) clutch package engagement and high pressure when sensing the disengaging of the C3 to cool the package. Thus, there is a unit for modifying an automatic transmission to provide enhanced performance in the power take off and transmission or a particular application of a trans-brake mechanism.

Figure 1:
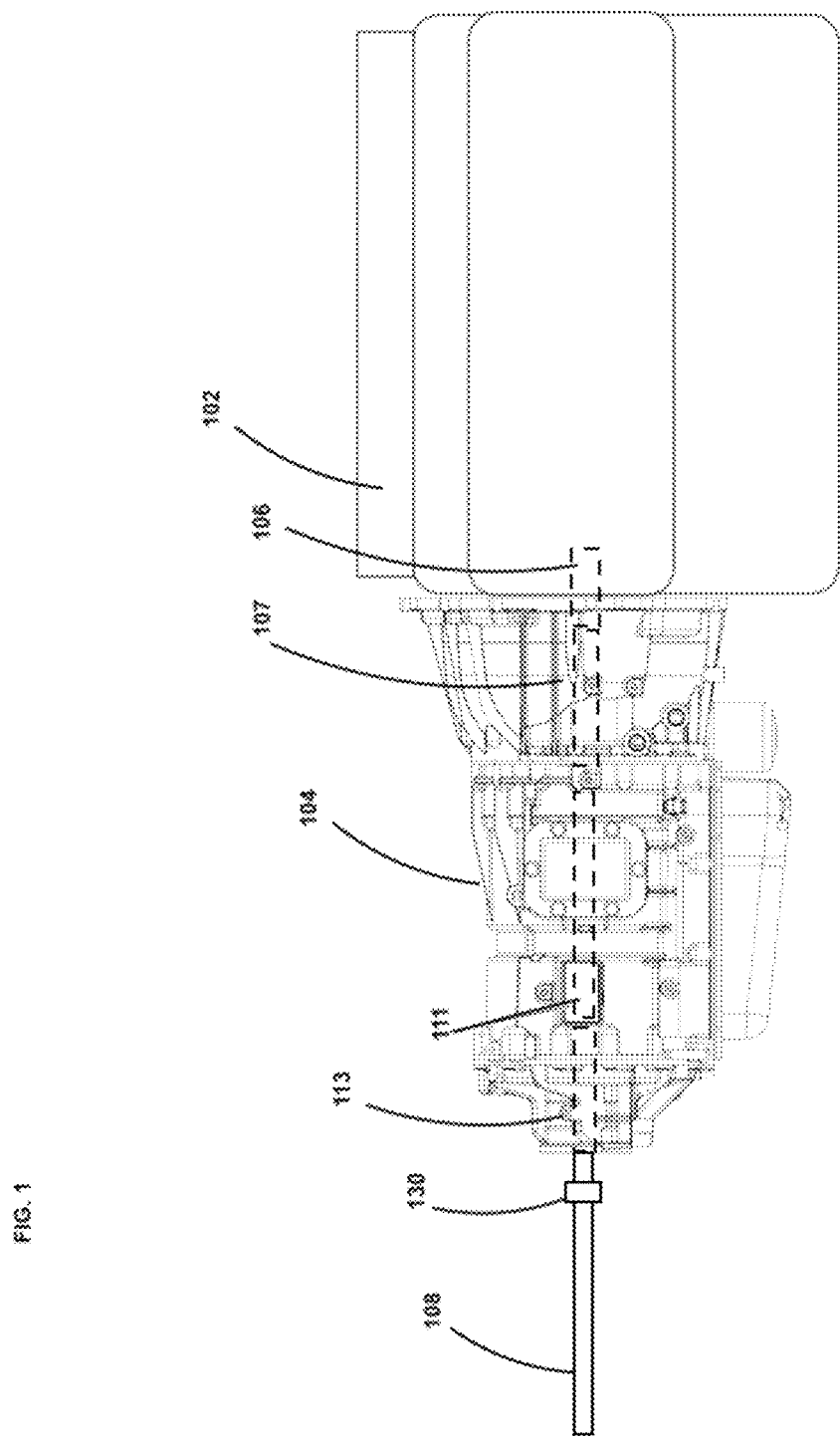
FIG. 1 is an illustration of a typical power and transmission unit of a vehicle.

The drawings, FIG. 1 depicts a schematic of one exemplary drive unit 102 and transmission 104 is shown. Gears of the transmission are determined by the TCM based off the gear selector and sensor inputs.

In the illustrated embodiment, the drive unit 102 may include an internal combustion engine, diesel engine, electric motor, or other power-generating device. The drive unit 102 is configured to rotatably drive a shaft 106 that is operably coupled to a shaft 108 via interconnected shafts 107, 111, 113 in transmission 104 as described below.

Figure 2:
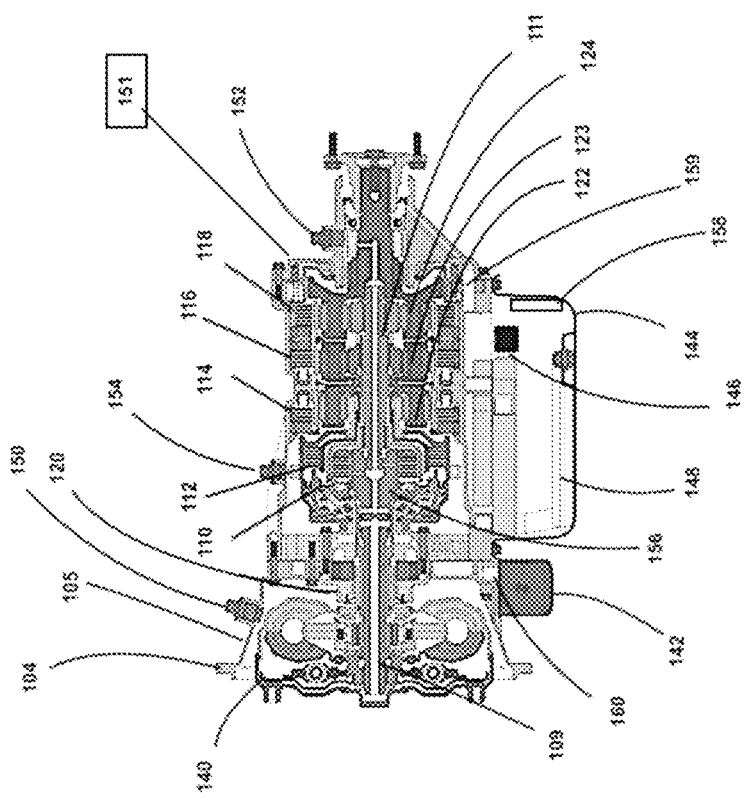
FIG. 2 is an exemplary block diagram and schematic view of one illustrative embodiment of a system of the invention.

As seen in FIG. 2, the transmission 104 can, for example, be that of an Allison Transmission® type, but others are contemplated, and include a housing 105, first clutch package 110, second clutch package 112, third clutch package 114, fourth clutch package 116 and fifth clutch package 118. A pump 120 can be driven by a shaft 109 that is coupled to the input shaft 106 of the drive unit 102 in FIG. 1. In this arrangement, the drive unit 102 in FIG. 1 can deliver torque to the input shaft 109 for driving the pump 120 and building pressure within the different circuits of the transmission 104 including C5 clutch package.

The transmission 104 can include a planetary gears 122, 123 and 124 in housing 105 can be automatically selected by the transmission control module (TCM) 151 inside a vehicle. An intermediate shaft 111, connects to shaft 113 of the transmission 104 and is coupled to or integral with, and rotatably drives, shaft 108 and is coupled via a conventional universal joint 130. The universal joint 130 is coupled to, and rotatably drives, an axle having wheels mounted thereto at each end. The shaft 113 of the transmission 104 connects to shaft 108 to drives the wheels of the vehicle in a conventional manner as is known in the art.

Other parts include a torque converter assembly 140, control main filter 142, oil pan 144, control valve modules 146, suction filter 148, input speed sensor 150, output speed sensor 152, turbine speed sensor 154 and rotating clutch module 156, solenoid package 158, and a fluid channel 159 which conventionally feed pressure to a piston 186 in clutch package 118. Now, as seen in FIG. 3, the system 10 of the instant invention for manipulating a normal gear progression of the transmission 104 by selectively controlling a clutch package, here 118, to perform as a brake to offset one or more clutch package, e.g., higher gear clutch packages, C1-C4, attempting to drive a vehicle in a forward position.

The automatic transmission 104 employs has a plurality of clutch packages 110, 112, 114, 116, and 118 to provide a low gear and a plurality of high gears and a transmission control module equipped to run the transmission in a normal start gear mode with shifting beginning from low gear and progressing to the higher gears and a higher start gear mode beginning at one of the higher gears. The system 10 provides a clutch brake mechanism which when actuated "on" during initiation of the higher start gear mode, applies increased pressure on a predetermined clutch package 118, commonly referred to as C5, creating a temporary clutch brake to keep in check one or more clutch packages, that engage second and higher drive gears. Upon actuating the system "off" releases the predetermined clutch package 118 thereby enabling enhanced take off speed with the high gear clutch packages 112 and 114 being fully engaged.

Figure 5:
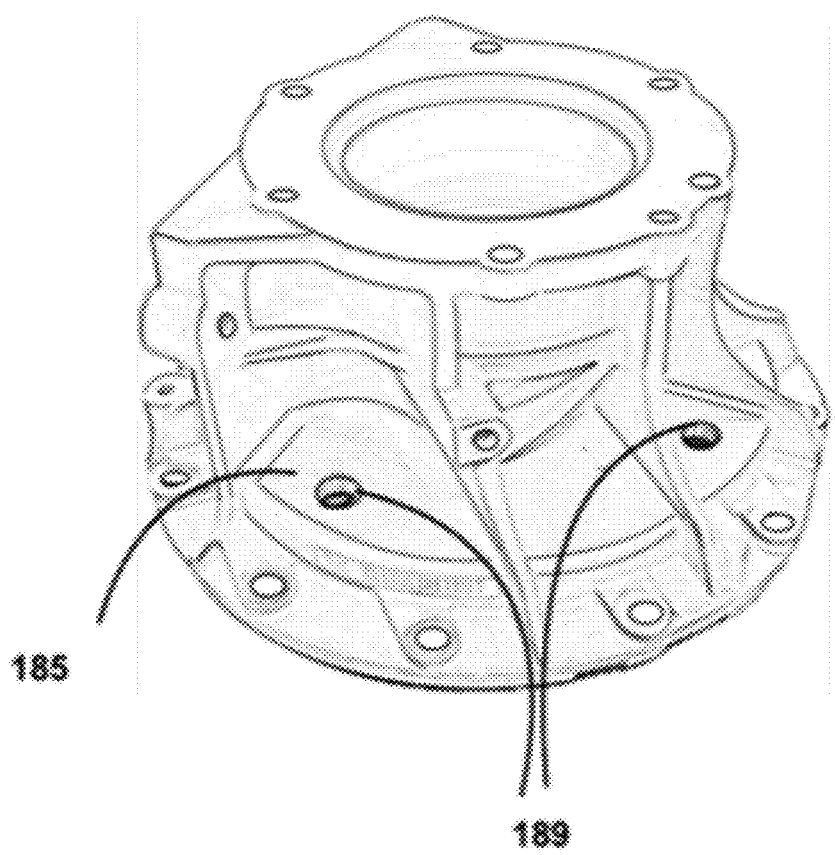
FIG. 5 is a perspective view of a tail housing.

As depicted in FIG. 3, the system 10 can include one or more solenoid 170, which in this case a preferred solenoid 170 is a 3-way valve solenoid with a controller box 172 which receives transmission fluid a first feed line 180 factory C5 supply from a transmission fluid supply reservoir 182 and as will be understood in viewing FIGS. 5-12, and delivers transmission fluid through a second feed line 184 from the one or more solenoid valve 170 to a back of a piston 186 (in dashed lines in FIG. 3) in the clutch package 118 through one or more orifice 189 in a tail housing 185 in FIG. 5. By applying pressure on the piston 186 which engages the clutch package 118 serving as a brake, this occurs when the system 10 is "on" receiving fluid through third feed line 187 in a one way flow path or when the system 10 is "off" and the TCM 151 sends a signal to apply pressure. When the system 10 is "off", the solenoid 170 blocks communication with the third feed line 187 and enables flow in a conventional manner to the piston 186 and return of transmission fluid through in a reverse manner through the solenoid 170 to the supply reservoir 182 through factory c5 port via orifices 163 to 161 thus enabling two way fluid flow through the solenoid 170. Further, there can be one or more solenoid 170 similarly configured and it is further contemplated that each can be configured to step up pressure delivered from the one or more solenoid 170. In using the system 10 as a retrofit application, normal transmission fluid channel 159 which feeds fluid line pressure to the piston 186 is blocked off, as the first feed line 180 of the system 10 replaces the fluid channel function.

Figure 6:
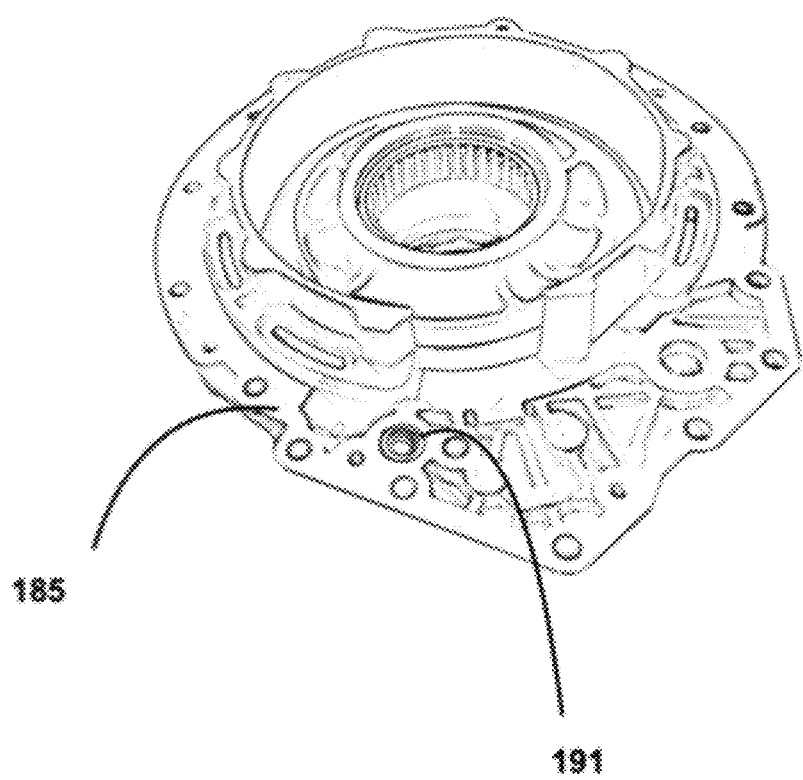
FIG. 6 is a perspective view of a tail housing.
Figure 7:
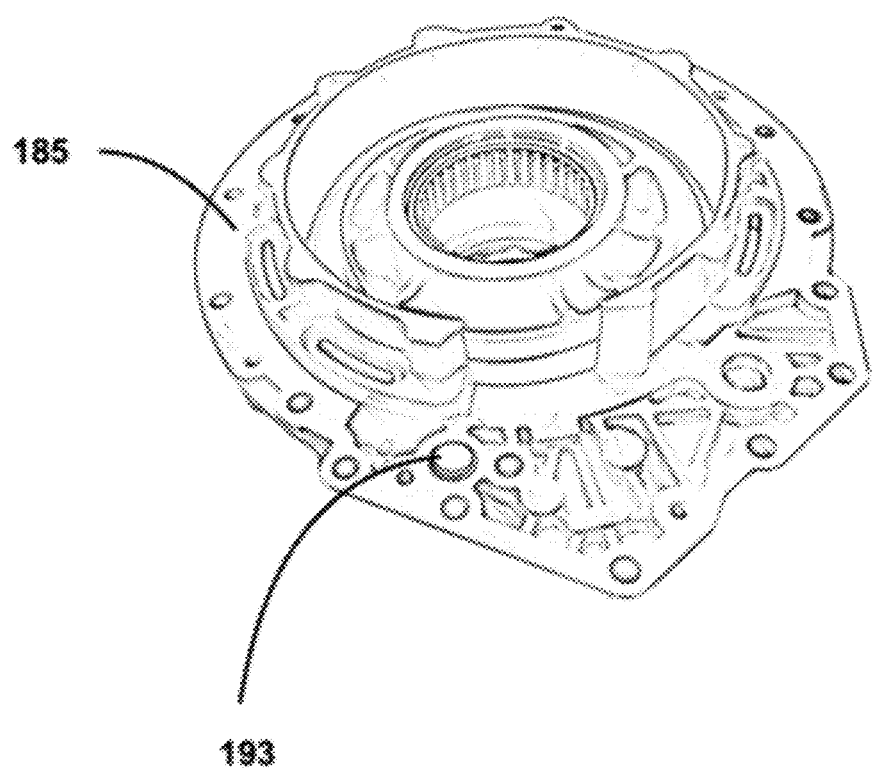
FIG. 7 is another perspective view of a modified tail housing with a plug.
Figure 8:
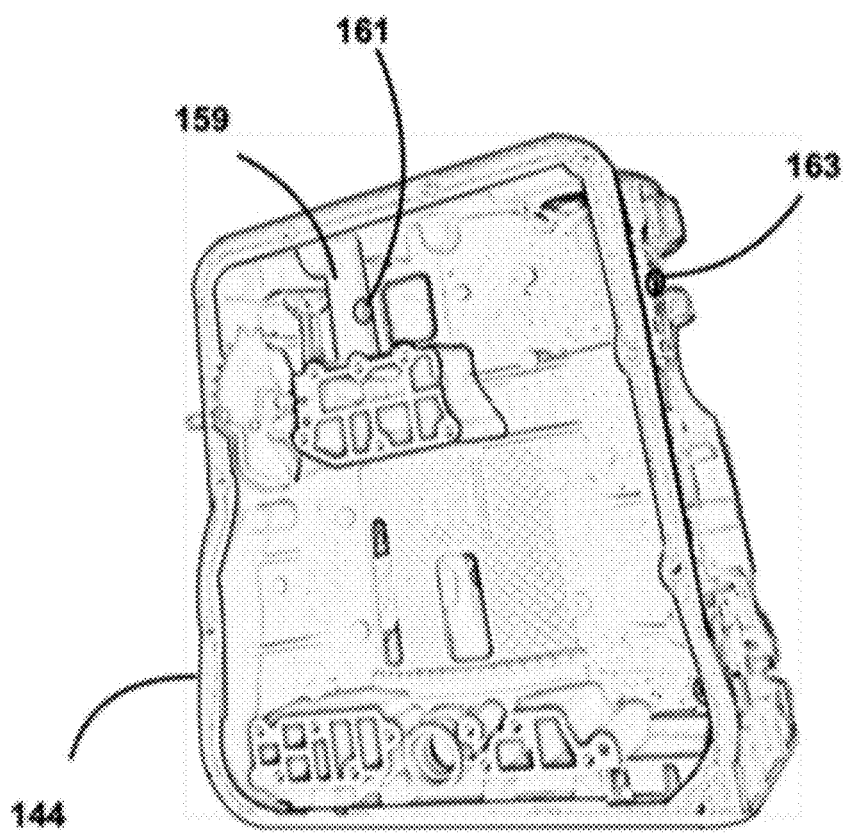
FIG. 8 is a perspective of a modified oil pan of the invention.
Figure 9:
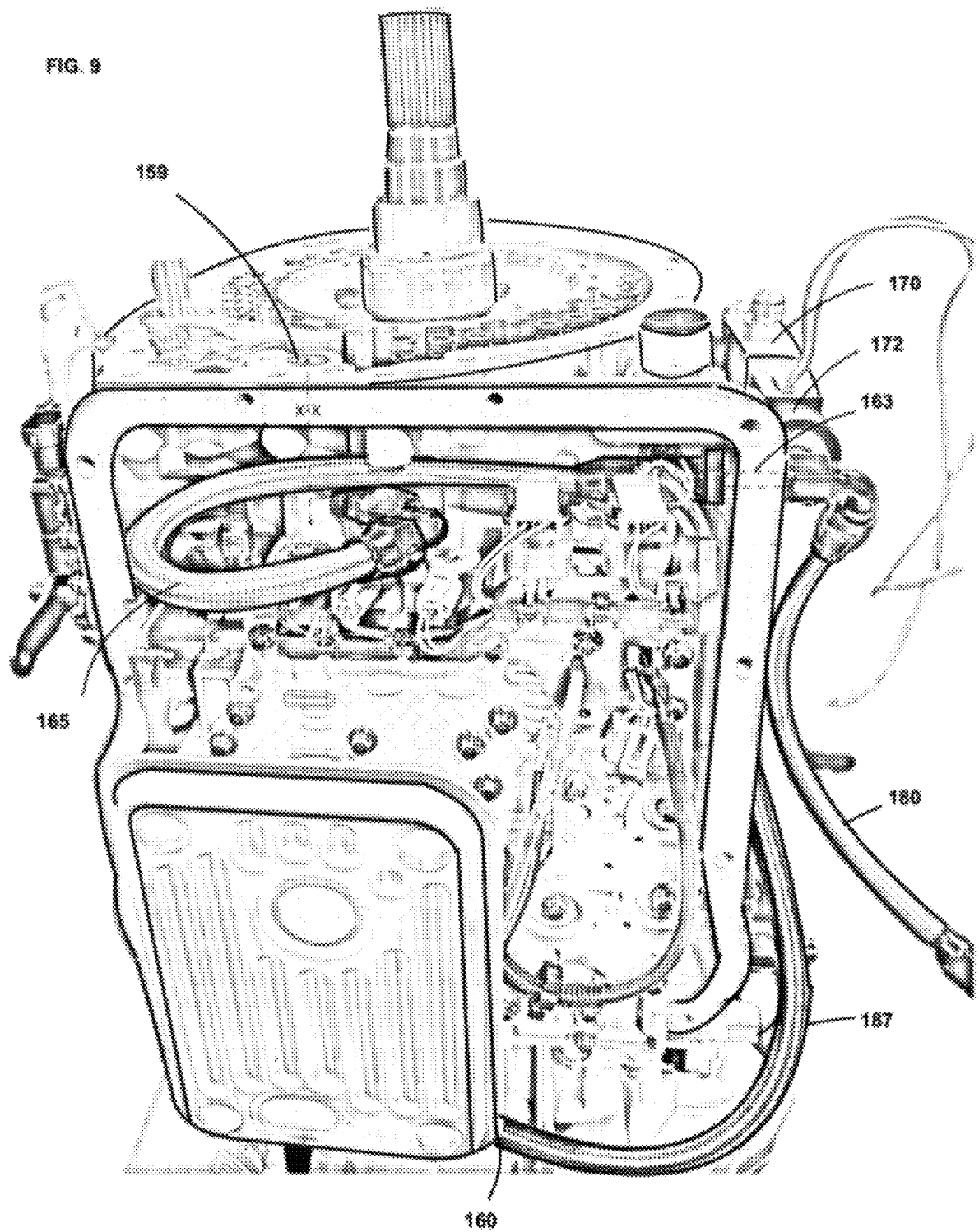
FIG. 9 is a perspective view of showing the modified oil pan of FIG. 8 mounted to a transmission with hose connections of the instant invention.

Note, FIGS. 5-7 depict the tail housing 185 which shows threaded orifices 189 made in the back side thereof. One or more solenoid 170 can be used to connect to the orifices 189. If only one is in use, then the other orifice 189 can be plugged off. As seen in FIGS. 6 and 7, inside of the tail housing 185 there exists a port 191 which normally mates to a fluid channel 159 which is in the transmission housing 105 above oil pan 144 as seen in FIGS. 8 and 9. As seen in FIG. 6, the port 191 has been modified in the instant invention to be threaded tapped and to receive a threaded plug 193 as seen in FIG. 7. This blocks the normal fluid communication in the transmission rerouting through the new system 10. Note, the path identified by line x-x through fluid channel 159 in the transmission 104 above oil pan 144 is blocked with plug 193 and the channel 159, which is a passage in a body portion of the transmission 104, is modified as seen in FIG. 8 to be bored and threaded to create threaded orifice 161 and the housing 105 above the oil pan 144 further includes another tapped threaded orifice 163. It is apparent from FIG. 9, a hose 165, e.g., −8 AN, interconnects the orifices 161 and 163 to feed the newly created path for normal operation of the transmission 104.

The system 10 includes a controller box 172 connected to the solenoid 170 to actuate the same on and off. Again, when in the "off" position, the communication between the third input feed line 187 and the solenoid 170 is shut off and fluid only flows back and forth through the solenoid 170 in order to perform under normal start gear mode with the existing transmission control module 151. When in the "on" position, the communication between the third input feed line 187 and the solenoid 170 is permitted and fluid flows to the solenoid 170 and pressure is increased and applied to the piston 186 to cause engagement of clutch package 118.

The controller 172 can be actuated manually though a switch mounted 190 which can be inside a vehicle including, for example, a momentary switch 190 on a steering wheel. Additionally, a bump switch 192, which can be a smart relay, can also be added to pause the action of the controller 172 and temporarily permit the disengagement of the clutch package 118. By tapping on the bump switch 192 while holding on the momentary switch 190, it can bump the vehicle forward.

It is important to note that controller 172 should only be active or preferably activatable when the TCM 151 is in the higher start gear mode and at the initiation of this mode or when the vehicle is stopped. In other words, severe damage could occur if the transmission 104 when activated while the vehicle is moving. Accordingly, a sensor 194 can be provided, such as a speed sensor, wherein the controller 172 is prevented from being actuated "on" preventing the fluid flow communication between the solenoid 170 to the main line transmission fluid feed 160 in which the line 187 connects to an existing port on a bottom of the transmission 104. The system 10 can optionally include an intensifier device 189, which can be an additional solenoid disposed in the third feed line 187 to further enhance fluid pressure.

Figure 10:
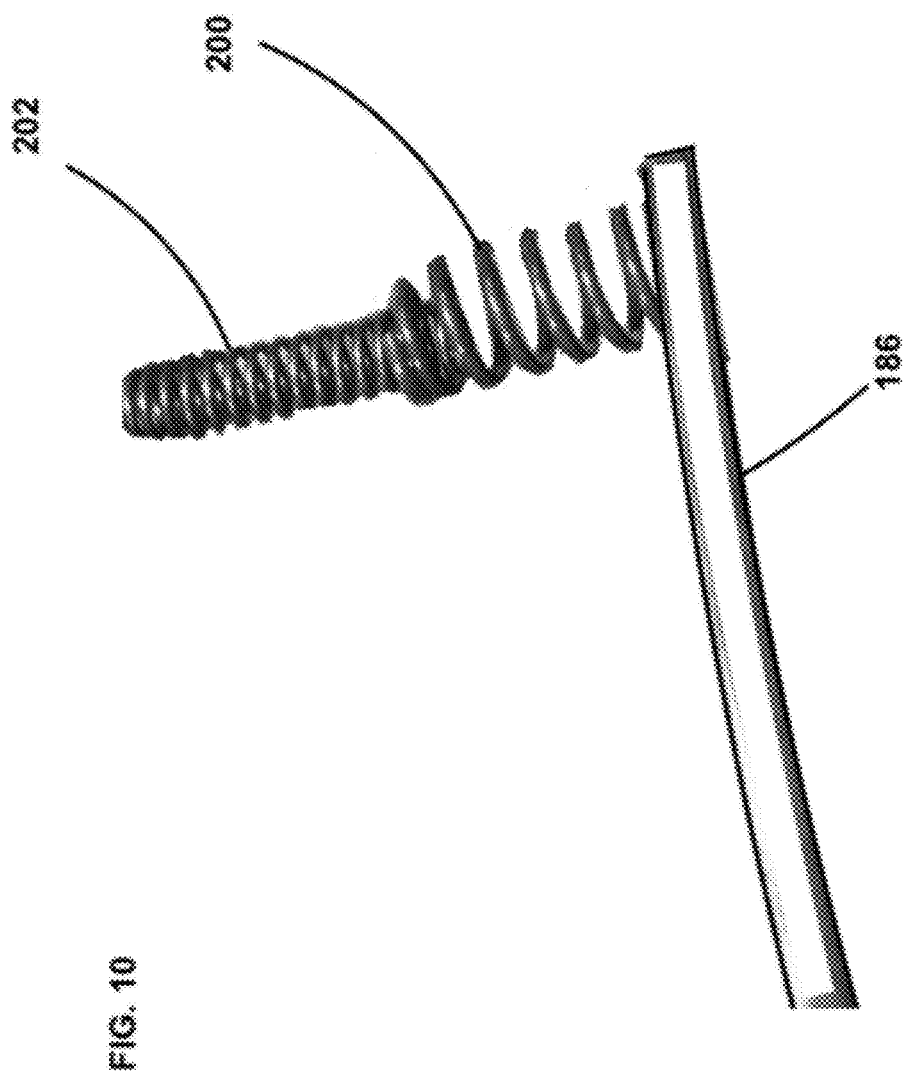
FIG. 10 depicts a perspective of part of a piston with a spring modification of the invention.
Figure 11:
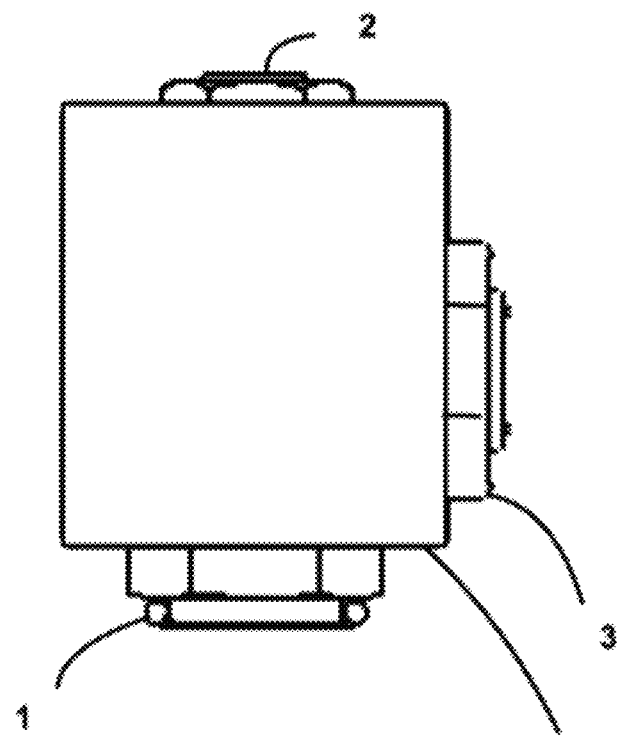
FIG. 11 depicts a three-way valve of the invention.
Figure 12:
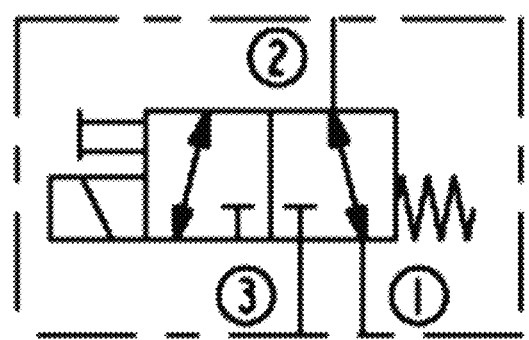
FIG. 12 depicts a schematic operation of the three-way valve of the invention.

With the increased amount of pressure and flow from mainline and modified mainline, line size of −8 AN or ½ inch from C5 piston housing to factory C5 port and a −6 AN or ⅜ inch main line 187 feed to solenoid 170, it is contemplated that there may be required modifications to enhance the return springs 200 in connection with the piston 186 and clutch package 118 to aid in return of the piston 186 to normal position. In this regard, accumulator piston springs 202 having an OD of 0.31 as seen in FIG. 10 fit inside stock spring 200 having ID 0.34 and can be provided to aid piston 186 in its return after its forced engagement during use.

Also, given the additional fluid which will be present during the "on" mode, there may be need to increase size or add additional bleed holes in the piston 186 through which the transmission fluid can pass and upon so doing will naturally find its way to the to the transmission oil pan 144 via an open area within a housing 105 of the transmission 104.

The transmission 104 further includes an electro-hydraulic system as is known in the art that is fluidly coupled to the planetary gear system. The electro-hydraulic system is responsive to control signals to selectively cause fluid to flow through one or more of the fluid paths to control operation, i.e., engagement and disengagement, of a plurality of corresponding friction devices in the planetary gear system. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system. In any case, changing or shifting between the various gears of the transmission is accomplished in a conventional manner by selectively controlling the plurality of friction devices via control of fluid pressure within the number of fluid paths.

The exemplary system 10 includes controller 172 connected to the one or more solenoid(s) 170 (In FIGS. 12 and 13) to control the solenoid(s) on and off. When in the "off" position with three-way port solenoid 170, fluid will flow from port 1 or factory C5 port to port 2 the C5 piston and port 3 on the solenoid 170 or main line will be blocked. When the system 10 is activated "on", port 1 or mainline will flow to port 2 or C5 piston and port 1 or factory C5 supply will be blocked with port 3 feeding stepped up pressure to port 2 and C5 piston. After solenoid valve 170 has been activated and deactivated, fluid will flow from C5 piston or port 2 on solenoid back to port 1 in a conventional manner with the factory C5 port exhausting back through lines 184, 180, orifice 163, line 165 and orifice 161 to channel 156 of valve body to an oil pan and port 3 will be blocked.

Using an alternative a two way solenoid 170 setup, a first solenoid 170 will be a normally open position exists in one solenoid 170 between factory C5 port and C5 piston that will freely flow fluid as the valve body supplies it. A second solenoid 170 will be normally closed with mainline suppling it on one side and the other side will be connected to the C5 piston supply. When activated both solenoids 170 will be energized, the first normally open solenoid 170 will close and stop flow from the C5 piston. The normally closed solenoid will open and supply mainline to C5 piston. After the two solenoid valves 170 have been activated and deactivated, mainline from the normally closed solenoid will be blocked and fluid will flow from the C5 will flow back through the normally open solenoid back to the factory C5 port in transmission.

The transmission control circuit 151 that can include a memory unit, microprocessor, and operating instructions stored therein that are executable by a processor of the transmission control circuit 151 to control operation of operation of the transmission 104, i.e., shifting between the various gears of the planetary gear system. It will be understood, however, that this disclosure contemplates other embodiments in which the transmission control circuit 151 is not microprocessor-based, but is configured to control operation of components based on one or more sets of hardwired instructions and/or software instructions stored in the memory unit.

While exemplary embodiments incorporating the principles of the present disclosure have been disclosed herein above, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A unit for selective fluid delivery to a predetermined clutch package in a power take off component of a transmission having by a transmission control module, which includes:
    an independent programmable logic controller operably connected to but not including the transmission control module for receiving data signals indicative of a clutch package engagement state;
    an actuatable valve operably connected to said independent programmable logic controller and disposed in a transmission fluid line, said programmable logic controller selectively controls said actuatable valve to permit variable fluid flow pressure to the said predetermined clutch package as a function of said data signals; and
    a base plate sealably connectable to a power take off surface area of the transmission having at least one threaded bore through which transmission fluid can pass to the predetermined clutch package, said base plate has at least one open surface co-aligned with said at least one threaded bore, said base plate including a basin in communication with said at least one open surface, and a complementary formed upper plate having at least one open surface co-aligned said at least one open surface of said base plate, and at least one threaded mounting member having an axially extending bore which intersects a radially extending bore which communicates with said basin when disposed through said open surfaces and connected to said threaded bore, said upper plate includes a protruding portion which has a fluid line connector open surface to receive a transmission fluid line connector and intersecting said fluid line connector open surface is a valve connector open surface which extends through said upper plate and is oriented that when connected to said base plate, communicates with said basin, and said actuatable valve opens and closes communication between said fluid line connector open surface and said valve connector open surface.

2. The unit for selective fluid delivery of claim 1, which includes a recess surface in said base plate and a protruding surface from said upper plate which mate to one another to ease assembly of said upper plate and said bast plate.

3. The unit for selective fluid delivery of claim 1, which includes a seal between said upper plate and said base plate.

4. The unit for selective fluid delivery of claim 1, which includes a seal between said power take off surface area and said base plate.

5. A unit for selective fluid delivery to a predetermined clutch package in a power take off component of a transmission, which includes:

a controller device separate and independent from and operably connected to a transmission control unit;

an actuatable valve operably connected to said controller device and disposed in a transmission fluid line, said controller device enables selective control of said actuatable valve to permit fluid flow pressure to the said predetermined clutch package; and a base plate sealably connectable to a power take off surface area of the transmission having at least one threaded bore through which transmission fluid can pass to the predetermined clutch package, said base plate has at least one open surface co-aligned with said at least one threaded bore, said base plate including a basin in communication with said at least one open surface, and a complementary formed upper plate having at least one open surface co-aligned said at least one open surface of said base plate, and at least one threaded mounting member having an axially extending bore which intersects a radially extending bore which communicates with said basin when disposed through said open surfaces and connected to said threaded bore, said upper plate includes a protruding portion which has a fluid line connector open surface to receive a transmission fluid line connector and intersecting said fluid line connector open surface is a valve connector open surface which extends through said upper plate and is oriented that when connected to said base plate, communicates with said basin, and said actuatable valve opens and closes communication between said fluid line connector open surface and said valve connector open surface.

6. The unit for selective fluid delivery of claim 5, which includes a recess surface in said base plate and a protruding surface from said upper plate which mate to one another to ease assembly of said upper plate and said bast plate.

* * * * *